(12) United States Patent
Fimoff et al.

(10) Patent No.: US 7,532,688 B2
(45) Date of Patent: May 12, 2009

(54) ADAPTIVE THRESHOLDING ALGORITHM FOR THE NOISE DUE TO UNKNOWN SYMBOLS IN CORRELATION BASED CHANNEL IMPULSE RESPONSE (CIR) ESTIMATE

(75) Inventors: Mark Fimoff, Hoffman Estates, IL (US); Sreenivasa M. Nerayanuru, Wheeling, IL (US); Christopher J. Pladdy, Chicago, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 19 days.

(21) Appl. No.: 11/690,560

(22) Filed: Mar. 23, 2007

(65) Prior Publication Data

US 2007/0189423 A1  Aug. 16, 2007

Related U.S. Application Data

(63) Continuation of application No. 10/227,661, filed on Aug. 26, 2002, now Pat. No. 7,239,679.

(60) Provisional application No. 60/383,919, filed on May 29, 2002.

(51) Int. Cl.
*H04L 1/00* (2006.01)
*H04L 25/08* (2006.01)

(52) U.S. Cl. .................................. 375/346; 375/229

(58) Field of Classification Search ......... 375/229–234, 375/346
See application file for complete search history.

(56) References Cited

U.S. PATENT DOCUMENTS

| 5,479,446 A | 12/1995 | Mourot |
| 5,533,047 A | 7/1996 | Mourot et al. |
| 6,246,732 B1 | 6/2001 | Kobayashi et al. |

(Continued)

FOREIGN PATENT DOCUMENTS

DE  43 29 317 A1  3/1995

(Continued)

OTHER PUBLICATIONS

Ozen et al., "A Novel Channel Estimation Method: Blending Correlation and Least-Squares Based Approaches", 2002 IEEE Intl. Conference on Acoustics, XP-002252707, pp. III-2281-III-2284, Aug. 7, 2002.

(Continued)

*Primary Examiner*—Chieh M. Fan
*Assistant Examiner*—Freshteh Aghdam

(57) ABSTRACT

An impulse response is estimated for a channel by estimating an intermediate impulse response of the channel. The intermediate impulse response comprises at least one multipath spike and one or more non-deterministic noise components at locations throughout the channel Then, a threshold function is applied to the estimated intermediate impulse response across at least a portion of the channel in order to provide an estimated final impulse response of the channel. The threshold function has the effect of nulling the noise components of the channel having values less than the threshold function at the location within the channel of the respective noise component, and the threshold function is characterized by a level that varies across the portion of the channel from a minimum value to a maximum value in a manner determined by the location of the at least one multipath spike within the channel.

16 Claims, 5 Drawing Sheets

U.S. PATENT DOCUMENTS

| | | |
|---|---|---|
| 6,510,143 B1 | 1/2003 | Bejjani et al. |
| 6,748,007 B1 * | 6/2004 | Lattard et al. ............... 375/142 |
| 6,771,591 B1 | 8/2004 | Belotserkovsky et al. |
| 6,907,092 B1 * | 6/2005 | Yakhnich et al. ............ 375/346 |
| 2001/0044289 A1 | 11/2001 | Tsuji et al. |
| 2002/0024994 A1 | 2/2002 | Piirainen et al. |
| 2003/0198303 A1 | 10/2003 | Taylor et al. |

FOREIGN PATENT DOCUMENTS

| | | | |
|---|---|---|---|
| EP | 0 682 420 A1 | 11/1995 | |
| EP | 1 058 402 A1 | 12/2000 | |

OTHER PUBLICATIONS

Ozen et al., "Structured Channel Estimation Based Decision Feedback Equalizers for Sparse Multipath Channels with Applications to Digital TV Receivers", 2002 IEEE, pp. 558-564, Nov. 3-6, 2002.

M. Fimoff et al., "Using 8-VSB Training Sequence Correlation as a Channel Estimation for DFE Tap Initialization", Sep. 2001, pp. 1201-1201.

C.A. Montemayor et al., "Near-Optimum Iterative Estimation of Dispersive Multipath Channels", 1998 IEEE, pp. 2246-2250, May 18-21, 1998.

* cited by examiner

ADAPTIVE THRESHOLDING ALGORITHM FOR THE NOISE DUE TO UNKNOWN SYMBOLS IN CORRELATION BASED CHANNEL IMPULSE RESPONSE (CIR) ESTIMATE

RELATED APPLICATIONS

This is a continuation of U.S. application Ser. No. 10/227,661 filed on Aug. 26, 2002, now U.S. Pat. No. 7,239,679, which claims the benefit of U.S. Provisional Application Ser. No. 60/383,919 filed on May 29, 2002.

TECHNICAL FIELD OF THE INVENTION

The present invention relates to thresholding that is applied to a channel impulse response resulting, for example, from a correlation of a received signal with a reference. The thresholding is arranged to eliminate data related noise from the channel impulse response. The channel impulse response may then be used to set the tap weights for the taps of an equalizer.

BACKGROUND OF THE INVENTION

Linear adaptive equalizers having a plurality of taps are widely used in digital communication receivers in order to provide correction for multipath channel distortion. Adaptive algorithms, such as the least mean squares (LMS) algorithm, are typically implemented in order to determine the weight values for the taps of the equalizer. Such adaptive algorithms are easy to implement and provide reasonably good performance. However, under difficult channel conditions, these algorithms may fail to provide tap weights that converge to the desired values.

It is well known that this failure may be avoided if the tap weights, instead of being initialized to values of zero as is often done, are initialized at least somewhat close to their final desired values based on a knowledge of the impulse response of the channel An estimate of the channel impulse response (CIR) may be derived from an a priori known training sequence periodically transmitted prior to, and/or along with, the unknown data. One such system with this feature is specified in the ATSC 8VSB standard for digital terrestrial television broadcasting.

The channel impulse response is typically estimated in a receiver by cross-correlating the training sequence as received with a representation of the known transmitted training sequence stored in the receiver as the reference. The Z-transform of the estimated channel impulse response is derived and inverted. From the inverted Z-transform, a vector is formed having a plurality of elements, and these elements are used to initialize a corresponding number of tap weights of the equalizer.

A conventional linear adaptive equalizer 10 that utilizes a transversal filter 12 is shown in FIG. 1. The transversal filter 12 comprises a plurality of taps $N_{ff}$ whose weights are applied to the received signal in order to eliminate the effects of multipath from the received signal. The transversal filter 12 includes a plurality of outputs $14_1$ through $14_n$ and a corresponding plurality of multipliers $16_1$ through $16_n$. The signal on each of the outputs $14_1$ through $14_n$ is multiplied by a corresponding tap weight from a conventional tap weight update algorithm 18 (such as an LMS) by a corresponding one of the multipliers $16_1$ through $16_n$. The outputs from the multipliers $16_1$ through $16_n$ are added together by an adder 20, and the output from the adder 20 is supplied as an output of the conventional linear adaptive equalizer 10.

The output from the adder 20 is also supplied to a decision directed/blind module 22 that compares the filter output with either the known training signal, when the known training signal is being received, or likely corrected data decisions, when the unknown data instead of the known training signal are being received. This comparison forms an error signal e that is used by the conventional tap weight update algorithm 18 to update the linear tap weights so as to minimize the value of the error e.

During training, the conventional tap weight update algorithm 18 typically estimates the channel impulse response by a-periodically cross-correlating the training sequence as received with a stored version of the known training sequence. If s[k] is defined as the stored known training sequence for k=0 . . . (L−1), and if x[k] is defined as the received signal sampled at the symbol rate, with x[0] being the first received training symbol in the received signal, the cross-correlation is given by the following equation:

$$h[m] = \sum_{k=0}^{L-1} s[k]x[k+m], \text{ for } -L_{chan} \leq m \leq L_{chan} \qquad (1)$$

where $L_{chan}$ is the length of the channel and is typically set at 576.

The conventional tap weight update algorithm 18 then determines the Z-transform of h[m] and inverts the Z-transform in order to determine the tap weights that are supplied to the multipliers $16_1$ through $16_n$.

This algorithm addresses channel related noise. However, there are other sources of noise. These other noise sources may, in a general, be described as deterministic noise and non-deterministic noise. Deterministic noise is noise that is known a priori. An example of deterministic noise is noise due to the finiteness of the cross-correlation as described in copending U.S. patent application Ser. No. 10/142,108 filed on May 9, 2002 and in copending U.S. patent application Ser. No. 10/142,110 filed on May 9, 2002.

As described in these applications, noise due to the finiteness of the cross-correlation may be determined by a-periodically cross-correlating a known training sequence with a received training sequence to produce a cross-correlation vector, by estimating a correction vector related to the finiteness noise component, and by iteratively subtracting truncated representations of the correction vector from the cross-correlation vector so as to produce a succession of cross-correlation outputs of increasing accuracy.

After the deterministic noise is removed from the channel impulse response, however, the channel impulse response still contains a noise component referred to herein as non-deterministic noise. The present invention is directed to the suppression of this non-deterministic noise from the channel impulse response.

SUMMARY OF THE INVENTION

According to one aspect of the present invention, a method for estimating the impulse response of a channel comprises the following: estimating an intermediate impulse response of the channel, where the intermediate impulse response comprises at least one multipath spike and one or more non-deterministic noise components at locations throughout the channel; and, applying a threshold function to the estimated intermediate impulse response across at least a portion of the channel in order to provide an estimated final impulse response of the channel, wherein the threshold function has the effect of nulling the noise components of the channel having values less than the threshold function at the location within the channel of the respective noise component, and wherein the threshold function is characterized by a level that varies across the portion of the channel from a minimum value to a maximum value in a manner determined by the location of the at least one multipath spike within the channel.

According to another aspect of the present invention, a method for adjusting the tap weights of an equalizer comprises the following: estimating an intermediate impulse response of a channel, where the intermediate impulse response comprises a plurality of multipath spikes and a plurality of non-deterministic noise components at locations throughout the channel; applying a variable level threshold function to the intermediate impulse response across at least a portion of the channel in order to provide a final impulse response of the channel, wherein the variable level threshold function has the effect of removing the noise components of the channel having values less than the variable level threshold function at locations within the channel corresponding to the noise components; determining the tap weights from the final impulse response; and, applying the tap weights to the equalizer.

According to still another aspect of the present invention, a method comprises the following: correlating a received signal with a known reference so as to estimate a channel impulse response of a transmission channel, where the channel impulse response comprises plural multipath spikes and plural data related noise components at corresponding correlation indices k; and, applying a threshold function, having a variable level dependent upon k, to the channel impulse response so as to remove each of the data related noise components having a value less than the threshold function at a corresponding one of the correlation indices k.

BRIEF DESCRIPTION OF THE DRAWINGS

These and other features and advantages will become more apparent from a detailed consideration of the invention when taken in conjunction with the drawings in which.

DETAILED DESCRIPTION

The non-deterministic noise in the channel impulse response arises at least in part because the stored version of the known training sequence is not only correlated with the received training sequence, but is also correlated with data during the cross-correlation. The training sequence, for example, may be based on the frame sync segment of a digital television signal as specified in the ATSC digital television standard.

Figure 2:
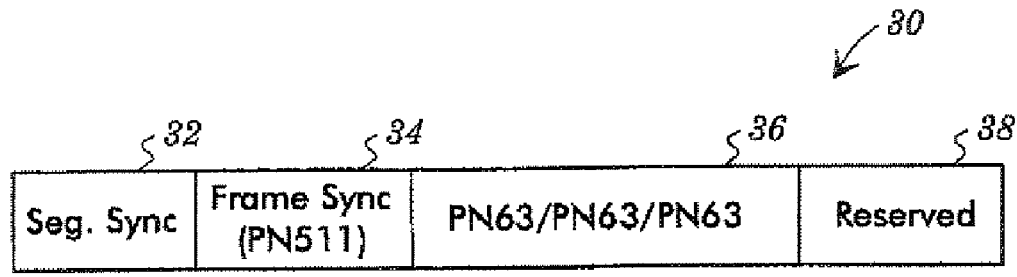
FIG. 2 illustrates a frame sync segment according to the ATSC digital television standard.

As shown in FIG. 2, such a frame sync segment 30 comprises a first portion 32 containing four segment sync symbols, a second portion 34 containing 511 frame sync symbols, a third portion 36 containing a 63 pseudorandom symbol sequence replicated three times for a total of 189 symbols, and a fourth portion 38 of reserved space for 24 symbols. The known training sequence or reference, according to the example, may comprise the first 515 symbols in the frame sync segment 30. Thus, this training sequence comprises the four segment sync symbols of the first portion 32 and the 511 frame sync symbols of the second portion 34 of the frame sync segment 30 for a total of 515 symbols.

Figure 3:
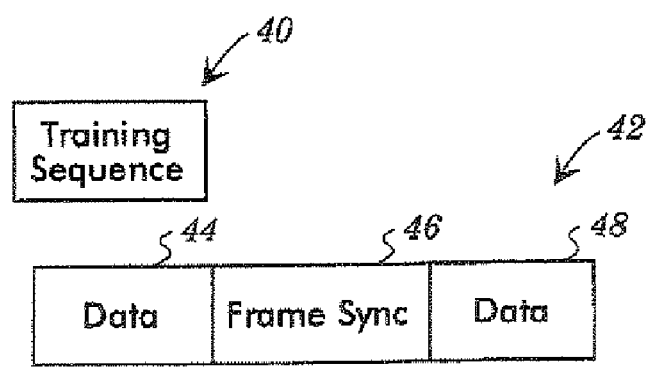
FIG. 3 illustrates a cross-correlation of a stored training sequence and a received signal.

As shown in FIG. 3, a cross-correlation based on this training sequence is implemented by shifting a training sequence 40, such as the 515 symbol training sequence described immediately above, over a received signal 42 that includes first data 44, the frame sync segment 46, and second data 48. Assuming that the received signal is received over a single path, the noise in the channel impulse response can be calculated according to the following equations:

$$n[k] = \sum_{i=1}^{Lcorr} s[i]x[i+k] \text{ for } k \neq 0 \quad (2)$$

$$n[k] = 0 \text{ for } k = 0 \quad (3)$$

where $L_{corr}$ is the length of the training sequence. In the example, $L_{corr}$ is 515. For $0 \leq k < 728$, the received signal x[k] in equation (2) is equal to the training sequence s[k], where 728 is the length of the frame sync segment 30. For all other values of k in the correlation, the received signal x[k] in equation (2) is equal to data d[k]. Substituting these values for x into equations (2) and (3) produces the following equations:

$$n[k] = \sum_{i=-k}^{Lcorr} s[i]s[i+k] + \sum_{i=0}^{-k-1} s[i]d[i+k] \quad -(L_{chan}-1) \leq k < 0 \quad (4)$$

$$n[k] = 0 \quad k = 0 \quad (5)$$

$$n[k] = \sum_{i=1}^{Lcorr} s[i]s[i+k] \quad 0 < k \leq (728 - L_{corr}) \quad (6)$$

-continued $$n[k] = \begin{array}{c} \sum_{i=1}^{728-k} s[i]s[i+k] + \\ \sum_{i=728-k+1}^{Lcorr} s[i]d[i+k] \end{array} \quad (728 - L_{corr}) < k \leq (L_{chan} - 1) \quad (7)$$

In equations (4)-(7), n[k] is the noise as it appears in the channel impulse response, s[k] is the reference training sequence stored in the receiver, and d[k] is the unknown data that is received before and after the received training signal.

As can be seen from equations (5) and (6), there are no unknown data symbols that contribute to the noise. These equations have only deterministic noise that can be removed from the channel impulse response by any suitable method, such as the one taught in the aforementioned applications. Therefore, if the channel contains a single path, the first $728-L_{corr}$ post cursor noise components in the channel impulse response can be removed so that this portion of the channel impulse response is noise free.

The noise in equations (4) and (7) has two parts. These equations are the sum of both deterministic noise due to the stored training sequence and non-deterministic noise due to the effect of the unknown data symbols on the correlation. The deterministic noise can be removed, as discussed above, using any suitable method, such as the one taught in the aforementioned applications. Accordingly, subtracting the deterministic noise from equations (4) through (7) results in non-deterministic noise ñ[k] according to the following equations;

$$\tilde{n}[k] = \sum_{i=0}^{-k-1} s[i]d[i+k] \quad -(L_{chan}-1) \leq k < 0 \quad (8)$$

$$\tilde{n}[k] = 0 \quad k = 0 \quad (9)$$

$$\tilde{n}[k] = 0 \quad 0 < k \leq (728 - L_{corr}) \quad (10)$$

$$\tilde{n}[k] = \sum_{i=728-k+1}^{Lcorr} s[i]d[i+k] \quad (728 - L_{corr}) < k \leq (L_{chan}-1) \quad (11)$$

Figure 4:
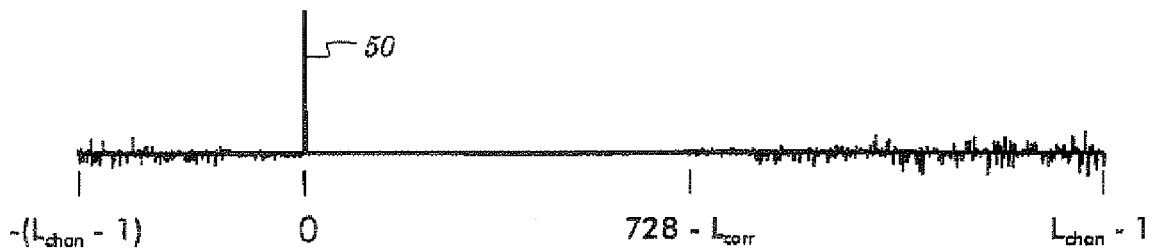
FIG. 4 illustrates the channel impulse response resulting from the correlation of FIG. 3 where deterministic noise has been removed.

As can be seen from equations (8) through (11), the only noise in the channel impulse response is from $-(L_{chan}-1)$ to 0 and from $(728-L_{corr})$ to $(L_{chan}-1)$. This noise is shown in FIG. 4, where deterministic noise has been removed and where a peak 50 represents the single path received signal in the channel impulse response. As can be seen from FIG. 4, the only noise in the channel impulse response is the unknown data related noise from $-(L_{chan}-1)$ to 0 and from $(728-L_{corr})$ to (Lchan-1) Assuming that the training sequence is 515 symbols and the length of the channel ($L_{chan}$) is 576, then the only noise in the channel impulse response, after the deterministic noise has been removed, is the unknown data related noise from −(575) to 0 and from (213) to (575), and no noise is present in the channel impulse response from 0 to 213.

Figure 5:
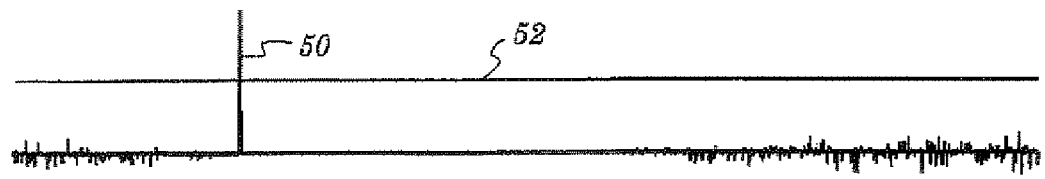
FIG. 5 illustrates the channel impulse response of FIG. 4 with an applied flat threshold.

This data related noise has been removed, in the past, using a flat threshold. For example, as shown in FIG. 5, a flat threshold 52 may be applied to the channel impulse response shown in FIG. 4. By applying the flat threshold 52, only the spikes having amplitudes above the flat threshold 52 are passed, and the noise components having amplitudes below the flat threshold 52 are removed.

Figure 6:
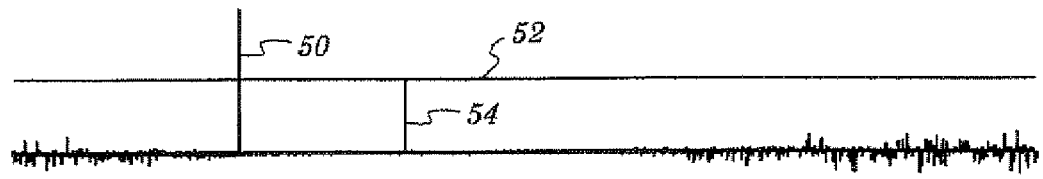
FIG. 6 illustrates a channel impulse response for a two path channel with an applied flat threshold.

The use of a flat threshold has a problem, however, when spikes resulting from multipath reception of the signal are present, which is the more prevalent case. Thus, as shown in FIG. 6, the flat threshold 52 that is applied according to FIG. 5 removes a spike 54 that resulted from the signal being received over a second path and that has an amplitude below the flat threshold 52.

Figure 7:
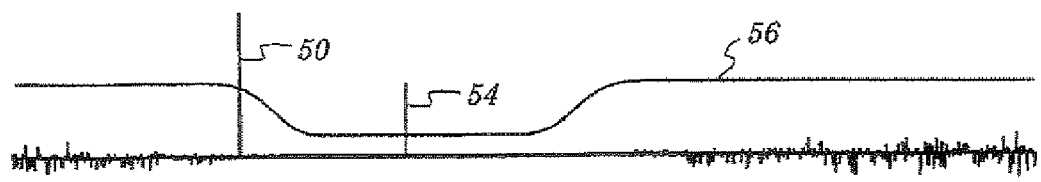
FIG. 7 illustrates the channel impulse response of FIG. 4 with an applied variable threshold.

If the multipath spikes are removed, the equalizer tap weights cannot be initialized close to their desired values Therefore, a variable threshold 56, according to the present invention, is applied to the channel impulse response as shown in FIG. 7. By applying the variable threshold 56, both the spike 50 and the spike 54 are passed because they both have amplitudes above the variable threshold 56. As in the case of the flat threshold 52, the noise components having amplitudes below the variable threshold 56 are removed.

Because unknown data are involved in equations (8) and (11), statistics may be used to estimate the noise and determine the variable threshold. The values of the data symbols in an 8 VSB transmission system are −7, −5, −3, −1, +1, +3, +5, and +7. The expected value of these data symbols is zero. Accordingly, this expected value provides no useful information about the data symbols at a specific instant of time.

However, the noise given by equations (8) and (11) may be squared, and the expectation of the squared noise may be derived in order to determine the second order statistics of the noise according to the following equation:

$$E\{\tilde{n}^2[k]\} = E\left\{\sum_i s[i]d[i+k]\sum_n s[n]d[n+k]\right\} \quad (12)$$

which may be re-written according to the following equation:

$$E\{\tilde{n}^2[k]\} = \sum_i \sum_n s[i]s[n]E\{d[i+k]d[n+k]\} \quad (13)$$

For all n≠i, equation (13) vanishes because E{d[i+k]d[n+k]} is zero. When n=i, equation (13) reduces to the following equation:

$$E\{\tilde{n}^2[k]\} = \sum_i s^2[i]E\{d^2[i+k]\} \quad (14)$$

Because s[i] in equation (14) is a binary training symbol in the case of a digital television signal, the $s^2[i]$ term in equation (14) can be replaced by a constant C. Also, the term E{$d^2$[i+k]} in equation (14) may be replaced with $\sigma_d^2$ which is the variance for all transmitted data. Accordingly, equation (14) may be re-written as the following equation:

$$E\{\tilde{n}^2[k]\} = \sum_i C\sigma_d^2 \quad (15)$$

Equation (15) may be re-written as the following equation:

$$E\{\tilde{n}^2[k]\} = C\sigma_d^2 N(k) \quad (16)$$

where N(k) is the number of terms in the summation of equation (15). This number of terms is a function of k and k is the index of the entries in the channel impulse response The number of terms $N(k)$ is given as follows:

$$N(k)=-k-(L_{chan}-1) \leq k<0 \quad (17)$$

$$N(k)=0 \quad 0 \leq k \leq (728-L_{corr}) \quad (18)$$

$$N(k)=k-(728-L_{corr}) \quad (728-L_{corr})<k \leq (L_{chan}-1) \quad (19)$$

From equations (15)-(19), it is apparent that the variance of the non-deterministic noise has a linear relationship with position in the channel impulse response because the number of terms $N(k)$ linearly increases with position in the channel impulse response. However, it is also apparent that the noise itself has a square root relationship with position in the channel impulse response.

Figure 8:
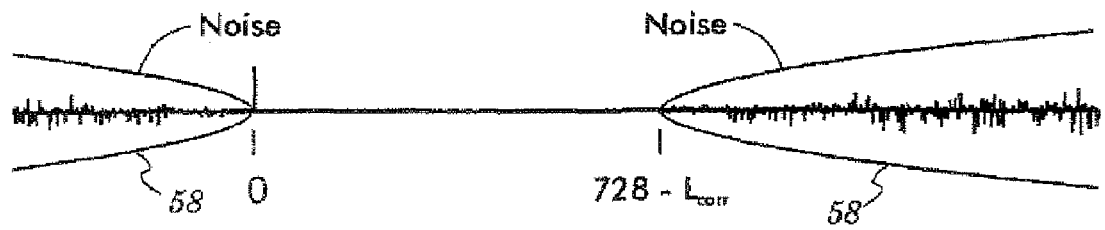
FIG. 8 illustrates the standard deviation of data related noise in a single path channel.

Accordingly, it may be concluded that, statistically, in the case of a single path, and in terms of standard deviation, the non-deterministic data related noise as a function of position in the channel impulse response has the shape illustrated in FIG. 8, where the zero position corresponding to the received signal is labeled. The noise profile shown in FIG. 8 may be used as a variable threshold 58 to eliminate data related noise in the case of a single path channel.

Figure 9:
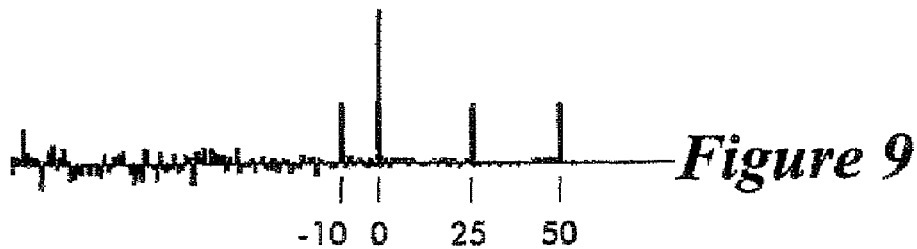
FIG. 9 illustrates an exemplary channel impulse response for a four path channel.

The case of a multiple path channel is, of course, more complicated. FIG. 9 shows an example of a channel where the signal is received over four paths as indicated by indices (positions) −10, 0, 25, and 50 in the channel impulse response. The main signal path is arbitrarily assumed to be the index 0. A threshold such as the threshold 58 shown in FIG. 7 may be developed for each spike in the channel impulse response for the multiple path channel, and all resulting thresholds may be added together so that a single composite variable level threshold may be applied to the channel impulse response in order to remove the data related, non-deterministic noise.

Figure 10:
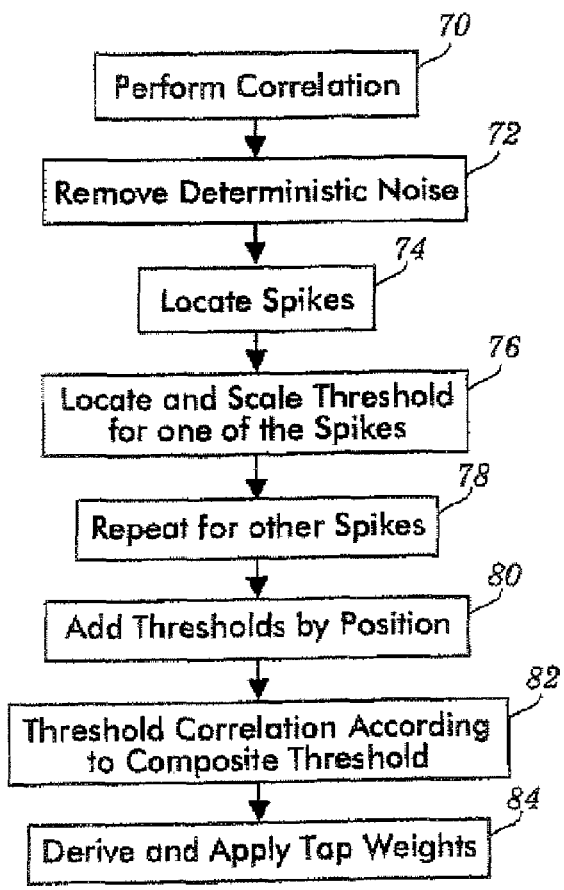
FIG. 10 illustrates a procedure for determining a composite variable threshold to be used in the case of a multiple path channel.

The procedure for determining this composite variable threshold is shown in FIG. 10. The received signal and the stored training sequence are correlated at 70 in order to derive the channel impulse response, and deterministic noise is remove from the channel impulse response at 72. Deterministic noise may be removed as discussed above.

In the case of a multiple path channel, the channel impulse response determined at 70 and 72 will have a spike representing each path over which the signal is received. Each such spike is located in the channel impulse response at 74 by use of any suitable method. For example, a flat threshold may be used to locate at least the major spikes.

At 76, the threshold 58 is positioned at a selected one of the spikes as shown in FIG. 7 and is scaled according to the magnitude of the correlation at the selected position. In a system such as digital television where the values of the transmitted data are known and where any given data symbol has an equal probability of being transmitted as any other data symbol, the shape of the threshold 58 may be determined beforehand so that the receiver need only scale the threshold 58 according to the amplitude of the spike currently being processed. For example, if the threshold 58 is determined based on a spike having a reference amplitude of A and the first spike being processed in the actual channel impulse response has an amplitude B, then the threshold 58 may be scaled by B/A in order to determine the threshold for the first spike being processed. At 78, the threshold 58 is similarly processed to generate a variable threshold for each of the other spikes located at 74.

Figure 11:
FIGS. 11-14 illustrate exemplary variable thresholds to be used in generating the composite variable threshold.
Figure 12:
Figure 13:
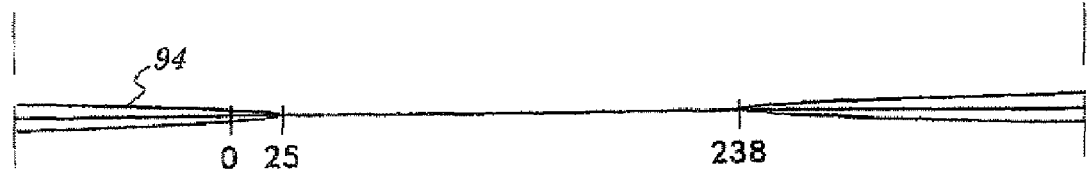
Figure 14:

At 80, the variable thresholds generated at 76 and 78 are added by first matching points in the variable thresholds by index and by then adding the points at each index. That is, using the example of FIG. 9, a variable threshold 90 (see FIG. 11) may be generated at 76 for the spike at index −10, a variable threshold 92 (see FIG. 12) may be generated at 74 for the spike at index 0, a variable threshold 94 (see FIG. 13) may be generated at 76 for the spike at index 25, and a variable threshold 96 (see FIG. 14) may be generated at 76 for the spike at index 50. Each of the thresholds has a flat section representing the portion of the correlation having no data related noise.

Figure 15:
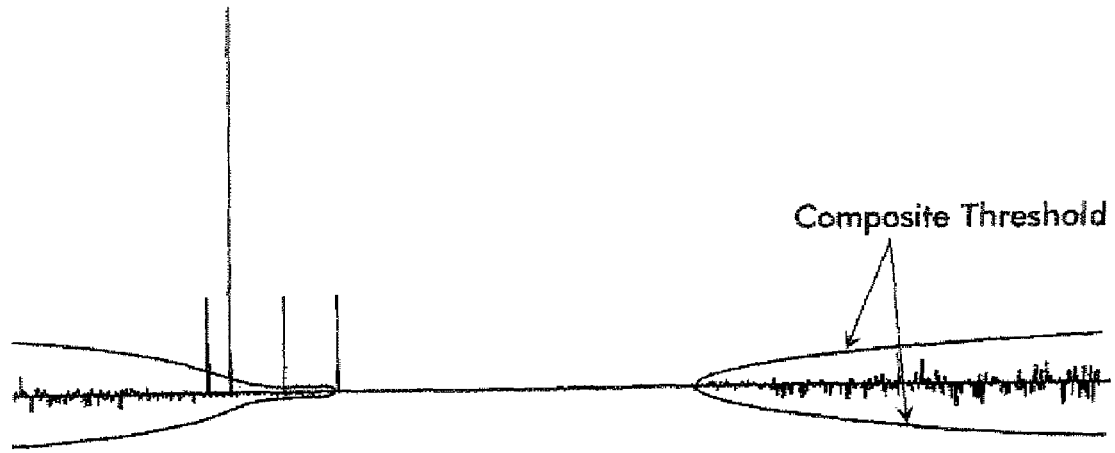
FIG. 15 illustrates the composite threshold formed from the variable thresholds of FIGS. 11-14, including the channel impulse response spikes and noise; and, FIG. 16 illustrates a linear adaptive equalizer whose tap weights may be adjusted according to the present invention.

The variable thresholds 90-96 are added by index (see FIG. 15 showing the composite threshold and the channel impulse response spikes and noise) Thus, using indices 0, 1, and 2 as examples, the value of each threshold at index 0 are added to determine the value of the composite threshold at index 0, the value of each threshold at index 1 are added to determine the value of the composite threshold at index 1, and the value of each threshold at index 2 are added to determine the value of the composite threshold at index 2. This process is performed for each of the other indices in the correlation.

At 82 of FIG. 10, the correlation is then thresholded using the variable threshold generated at 80 in order to remove the data related (non-deterministic) noise. The resulting noise free channel impulse response is then processed at 84 in order to derive the tap weights as explained above.

Figure 16:
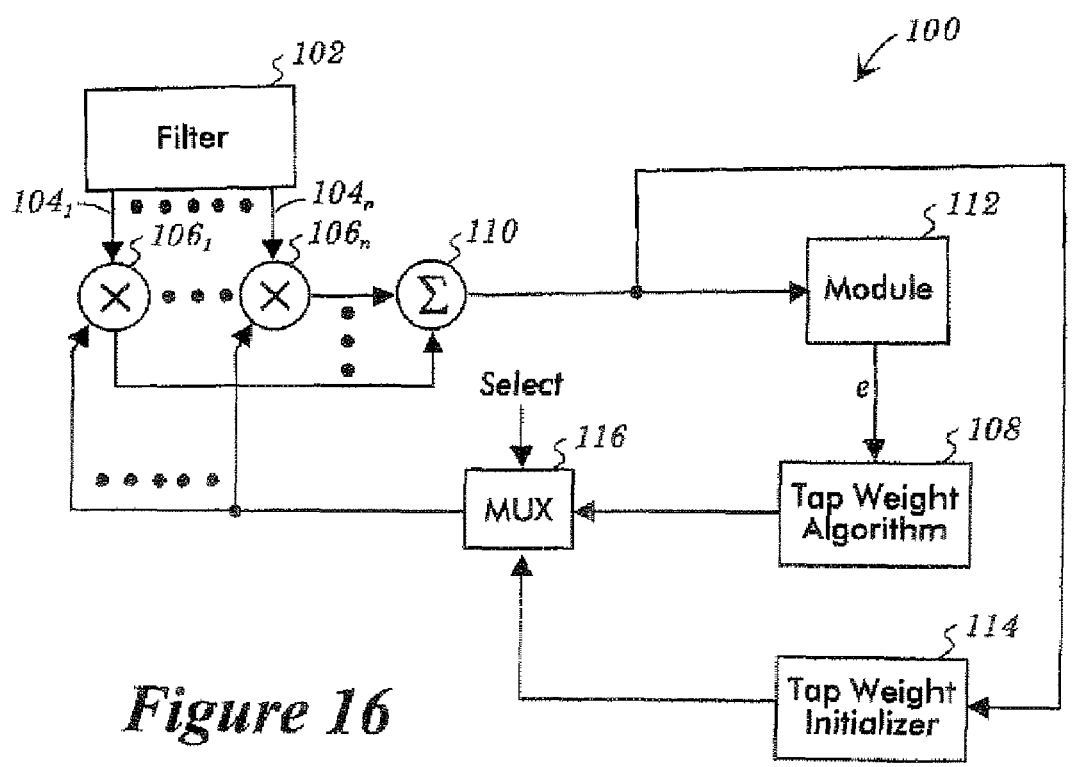

A linear adaptive equalizer 100 as shown in FIG. 16 may implement the procedure shown in FIG. 10. The linear adaptive equalizer 100 utilizes a transversal filter 102 having a plurality of outputs $104_1$ through $104_n$ and a corresponding plurality of multipliers $106_1$ through $106_n$. The signal on each of the outputs $104_1$ through $104_n$ is multiplied by a corresponding tap weight from a conventional tap weight update algorithm 108 (such as an LMS) by a corresponding one of the multipliers $106_1$ through $106_n$. The outputs from the multipliers $106_1$ through $106_n$ are added together by an adder 110, and the output from the adder 110 is supplied as an output of the linear adaptive equalizer 100 The output from the adder 110 is also supplied to a decision directed/blind module 112 that compares the filter output with either the known training sequence, when the known training sequence is being received, or likely corrected data decisions when the unknown data instead of the known training signal are being received This comparison forms an error signal e.

Figure 1:
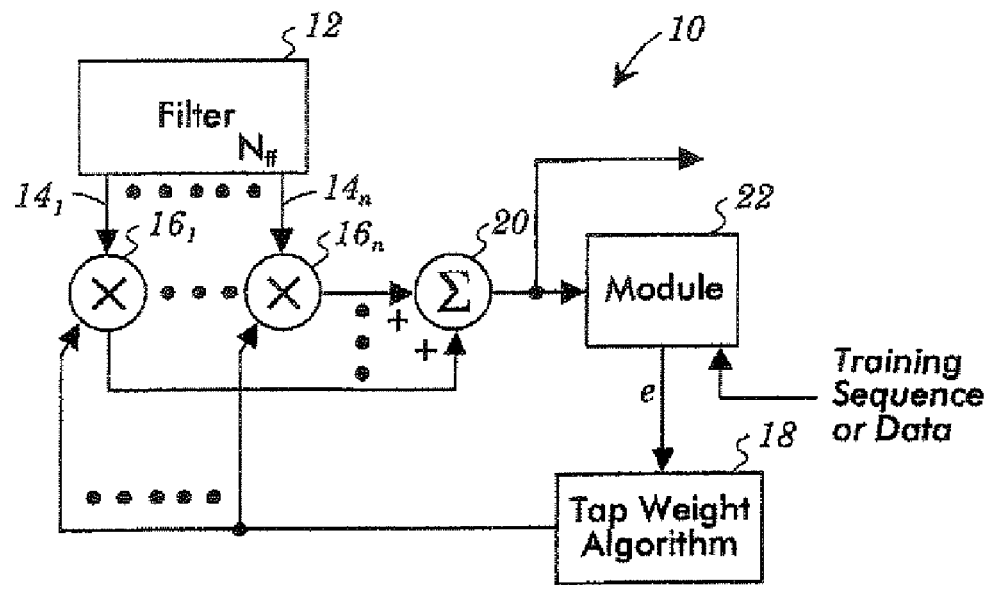
FIG. 1 illustrates a conventional linear adaptive equalizer whose tap weights may be adjusted as described above.

As described up to this point, the linear adaptive equalizer 100 is the same as the conventional linear adaptive equalizer 10 shown in FIG. 1. However, unlike the conventional linear adaptive equalizer 10 shown in FIG. 1, the output of the transversal filter 102 is used by a tap weight initializer 114 to initialize the tap weights applied by the multipliers $106_1$ through $106_n$. The tap weight initializer 114 implements the procedure described above in relation to FIG. 10. For example, in the case where the present invention is used in a digital television application, the tap weight initializer 114 initializes the tap weights applied by the multipliers $106_1$ through $106_n$ during a brief period of time following a channel change. During this brief period of time, a multiplexer 116 selects the tap weight initializer 114 in order to apply the tap weights from the tap weight initializer 114 to the multipliers $106_1$ through $106_n$. Otherwise, the multiplexer 116 selects the conventional tap weight update algorithm 108 in order to apply the tap weights from the conventional tap weight update algorithm 108 to the multipliers $106_1$ through $106_n$.

Modifications of the present invention will occur to those practicing in the art of the present invention For example, the present invention may be used in applications other than digital television, in which case a training sequence other than a portion of the frame sync segment of a digital television signal may be used to generate the channel impulse response.

Also, the present invention has been described above with specific application to equalizers. However, the present invention may be used to set up other circuits.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim

1. A method for adjusting the tap weights of an equalizer comprising:
   estimating an intermediate impulse response of a channel, wherein the intermediate impulse response comprises a plurality of multipath spikes and a plurality of non-deterministic noise components at locations throughout the channel;
   applying a variable level threshold function to the intermediate impulse response across at least a portion of the channel in order to provide a final impulse response of the channel, wherein the variable level threshold function comprises a plurality of components, wherein each of the components comprises a statically predetermined shape spanning plural indices of the intermediate impulse response, wherein the variable level threshold function has the effect of removing the noise components of the channel having values less than the variable level threshold function at locations within the channel corresponding to the noise components, and wherein the variable level threshold function is characterized by a level that varies across the at least portion of the channel;
   determining the tap weights from the final impulse response; and,
   applying the tap weights to the equalizer.

2. The method of claim 1 wherein the applying of a variable level threshold function to the intermediate impulse response comprises:
   forming an intermediate threshold function in response to each of the multipath spikes; and,
   combining the intermediate threshold functions to form the variable level threshold function.

3. The method of claim 1 wherein the estimating of the intermediate impulse response comprises correlating a signal received over the channel with a reference to produce a correlation having a number of terms.

4. The method of claim 3 wherein the applying of a variable level threshold function comprises applying a variable level threshold function having a linear relationship with the number of terms in the correlation and a square root relationship with data in the correlation.

5. The method of claim 3 wherein the applying of a variable level threshold function to the intermediate impulse response comprises:
   forming an intermediate threshold function in response to each of the multipath spikes; and,
   combining the intermediate threshold functions to form the variable level threshold function.

6. The method of claim 1 wherein the applying of a variable level threshold function comprises applying a variable level threshold function based on an expectation of squared transmitted data.

7. The method of claim 1 wherein the applying of a variable level threshold function comprises applying a variable level threshold function based on an expectation of squared transmitted data and an index k of entries in the intermediate impulse response.

8. The method of claim 7 wherein the applying of a variable level threshold function based on an expectation of squared transmitted data and an index k of entries in the intermediate impulse response comprises applying a variable level threshold function according to the following equation:

$$E\{\tilde{n}^2[k]\} = C\sigma_d^2 N(k)$$

wherein $\sigma_d^2$ comprises the variance for all transmitted data, wherein C comprises a constant, wherein $E\{\tilde{n}^2[k]\}$ comprises the expectation of squared transmitted data, wherein $N(k)$ is given as follows:

$$N(k) = -k - (L_{chan} - 1) \leq k < 0$$

$$N(k) = 0 \quad 0 \leq k \leq (P - L_{corr})$$

$$N(k) = k - (P - L_{corr}) \quad (P - L_{corr}) < k \leq (L_{chan} - 1)$$

wherein $L_{chan}$ comprises a length of the channel, wherein $L_{corr}$ comprises a length of a correlation between a signal received over the channel and a reference, and wherein P is a constant corresponding to the length of a known training sequence.

9. The method of claim 8 wherein P comprises 728.

10. The method of claim 8 wherein the constant C is related to data in the reference.

11. The method of claim 10 wherein p comprises 728 and the reference comprises a known training sequence.

12. The method of claim 1 wherein each of the components is scaled according to a magnitude of a corresponding one of the multipath spikes.

13. A method for estimating the impulse response of a channel comprising:
   estimating an initial impulse response of the channel according to a correlation of a received signal with a training sequence;
   removing deterministic noise from the initial channel impulse response to produce an intermediate channel impulse response, wherein the deterministic noise comprises noise resulting substantially from autocorrelation of the training sequence;
   locating a plurality of multipath spikes in the intermediate channel impulse response, wherein each of the multipath spikes has a unique index in the intermediate channel impulse response;
   locating a threshold component at each of the indices of the multipath spikes, wherein each of the threshold components extends over a plurality of indices of the intermediate channel impulse response;
   combining the threshold components by index to produce a final threshold; and,
   applying the final threshold to the intermediate channel impulse response so as to null out noise components from the intermediate channel impulse response that have values less than the final threshold and so as to produce a final channel impulse response.

14. The method of claim 13 further comprising deriving tap weights for an equalizer from the final channel impulse response.

15. The method of claim 13 wherein the combining of the threshold components includes scaling each of the threshold components according to a magnitude of a corresponding one of the multipath spikes.

16. The method of claim 15 further comprising deriving tap weights for an equalizer from the final channel impulse response.

* * * * *